(12) United States Patent
Machii

(10) Patent No.: US 9,063,618 B2
(45) Date of Patent: Jun. 23, 2015

(54) COORDINATE INPUT APPARATUS

(75) Inventor: Ritsuo Machii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 773 days.

(21) Appl. No.: 13/155,372

(22) Filed: Jun. 7, 2011

(65) Prior Publication Data

US 2011/0304535 A1   Dec. 15, 2011

(30) Foreign Application Priority Data

Jun. 15, 2010 (JP) ................................ 2010-136650

(51) Int. Cl.
| G06F 3/042 | (2006.01) |
| G06F 3/041 | (2006.01) |
| G06F 3/033 | (2013.01) |
| G06F 3/01 | (2006.01) |
| G09G 5/00 | (2006.01) |
| G08C 21/00 | (2006.01) |

(52) U.S. Cl.
CPC .... *G06F 3/0428* (2013.01); *G06F 2203/04101* (2013.01)

(58) Field of Classification Search
USPC ........................................................ 345/175
See application file for complete search history.

(56) References Cited

U.S. PATENT DOCUMENTS

| 5,764,223 | A | * | 6/1998 | Chang et al. .................. 345/175 |
| 6,480,187 | B1 | * | 11/2002 | Sano et al. ..................... 345/175 |
| 6,570,103 | B1 | * | 5/2003 | Saka et al. .................. 178/18.01 |
| 2002/0050985 | A1 | * | 5/2002 | Takekawa et al. ............ 345/173 |
| 2008/0068352 | A1 | * | 3/2008 | Worthington et al. ........ 345/175 |
| 2009/0309853 | A1 | * | 12/2009 | Hildebrandt et al. ......... 345/175 |
| 2011/0050644 | A1 | * | 3/2011 | Su et al. ....................... 345/175 |
| 2011/0128218 | A1 | * | 6/2011 | Kroeker et al. .............. 345/156 |

FOREIGN PATENT DOCUMENTS

| JP | 2004192065 A | * | 7/2004 | ............... G06F 3/03 |
| JP | 4118664 | | 7/2008 | |

* cited by examiner

*Primary Examiner* — Alexander S Beck
*Assistant Examiner* — Nguyen H Truong
(74) *Attorney, Agent, or Firm* — Fitzpatrick, Cella, Harper & Scinto

(57) ABSTRACT

According to one aspect of the invention, a coordinate input apparatus for calculating a position of an object positioned on an input area comprises: a light projecting unit; retroreflecting members arranged along two opposite sides of a rectangular area including the input area, and having a reflecting surface which reflects the light emitted by the light projecting unit; a light receiving unit; and a calculation unit configured to calculate the position of the object based on a measurement result from the light receiving unit, wherein a set of the light projecting unit and the light receiving unit arranged adjacent to the retroreflecting member to sandwich the retroreflecting member in a direction perpendicular to a surface of the input area are positioned in at least two portions of each of the retroreflecting members arranged on the two opposite sides.

15 Claims, 15 Drawing Sheets

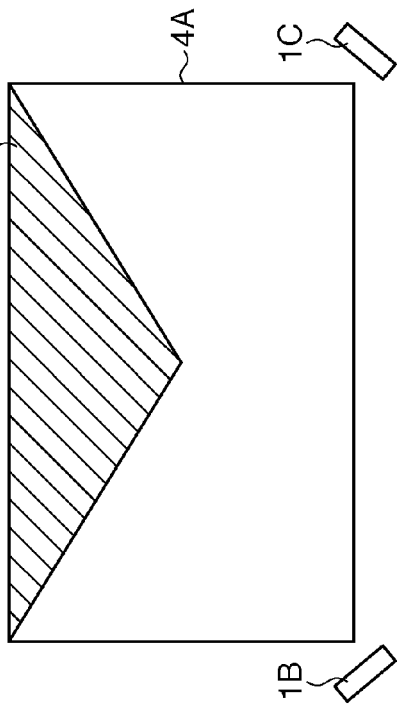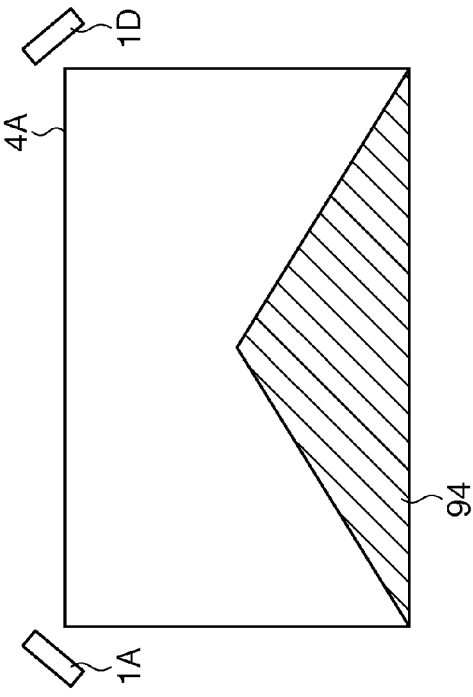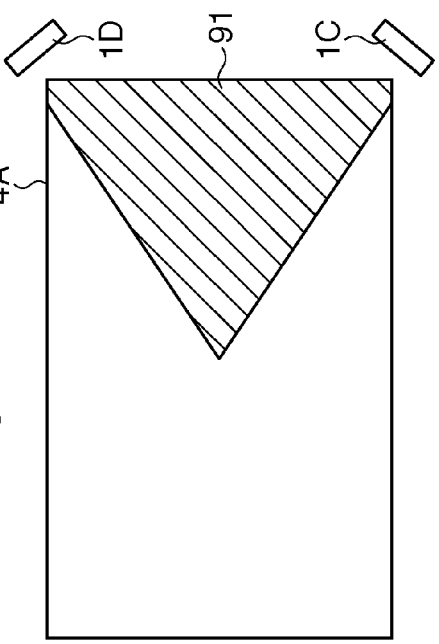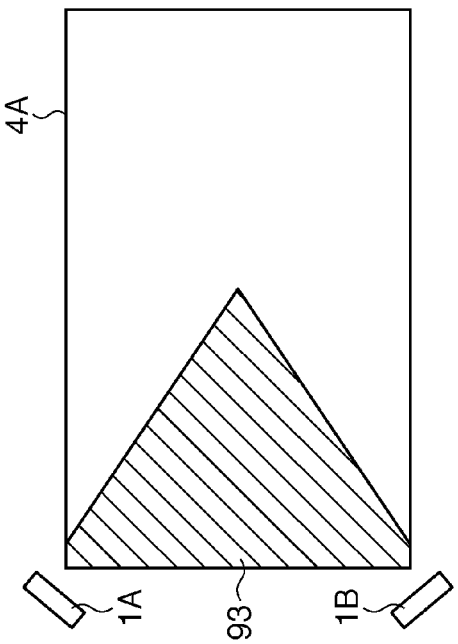

US 9,063,618 B2

COORDINATE INPUT APPARATUS

BACKGROUND OF THE INVENTION

1. Field of the Invention

The present invention relates to a coordinate input apparatus for optically detecting the coordinates of a pointing device.

2. Description of the Related Art

An optical coordinate input apparatus for obtaining the coordinates of a pointing device by detecting that light is blocked by the pointing device has conventionally been known. FIG. 9A shows an example of the optical coordinate input apparatus. This coordinate input apparatus shown in FIG. 9A includes sensor units 901 each including a light projecting unit and light receiving unit, and retroreflecting members 903 for retroreflecting incident light in the incident direction. A pointing device 907 existing on an input area 902 blocks light projected from the light projecting unit in the direction of the pointing device 907 and reflected toward the light receiving unit by the retroreflecting member 903. The position of the pointing device 907 is thus detected.

Japanese Patent No. 4118664 has disclosed a coordinate input apparatus in which a sensor unit is arranged behind a retroreflecting member. More specifically, a light projecting unit projects light through a gap between the retroreflecting member and an input area, and light enters a light receiving unit through the same gap. In this arrangement according to Japanese Patent No. 4118664, the sensor unit can be arranged in a position where the retroreflecting member is arranged.

In the coordinate input apparatus according to Japanese Patent No. 4118664, however, the position of a pointing device may not be detected unless the pointing device is brought into contact with the input area in the vicinity of the sensor unit. This will be explained in detail below with reference to FIG. 9B. In the arrangement of Japanese Patent No. 4118664, light emitted from the light projecting unit of the sensor unit 901 is reflected by the retroreflecting member 903, and reaches the light receiving unit of the sensor unit 901. As shown in FIG. 9B, when the pointing device 907 exists near the sensor unit 901 and is not in contact with the input area 902, the pointing device 907 does not block the light. Accordingly, the pointing device 907 is not detected.

SUMMARY OF THE INVENTION

The present invention avoids a decrease in position detectability near a light projecting unit and light receiving unit in an optical coordinate input apparatus, when the light projecting unit and light receiving unit are arranged in the position of a retroreflecting member.

According to one aspect of the invention, a coordinate input apparatus for calculating a position of an object positioned on an input area comprises: a light projecting unit configured to emit light toward the input area; retroreflecting members arranged along two opposite sides of a rectangular area including the input area, and having a reflecting surface which reflects the light emitted by the light projecting unit; a light receiving unit configured to receive the light emitted from the light projecting unit and reflected by the reflecting surface of the retroreflecting member, and measure intensity of the received light; and a calculation unit configured to calculate the position of the object based on a measurement result from the light receiving unit, wherein a set of the light projecting unit and the light receiving unit arranged adjacent to the retroreflecting member to sandwich the retroreflecting member in a direction perpendicular to a surface of the input area are positioned in at least two portions of each of the retroreflecting members arranged on the two opposite sides.

According to the invention, a decrease in position detectability near a light projecting unit and light receiving unit in an optical coordinate input apparatus can be avoided, when the light projecting unit and light receiving unit are arranged in the position of a retroreflecting member.

Further features of the present invention will become apparent from the following description of exemplary embodiments (with reference to the attached drawings).

BRIEF DESCRIPTION OF THE DRAWINGS

FIGS. 11A to 11D are views showing examples of an input area where each sensor unit according to the first embodiment performs detection;

DESCRIPTION OF THE EMBODIMENTS

Figure 1A:
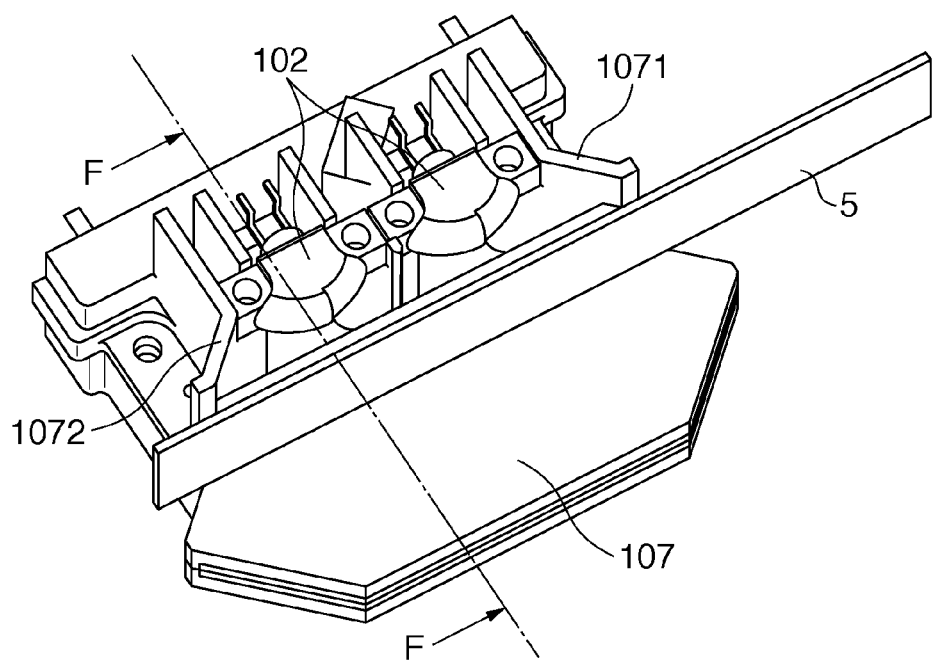
FIGS. 1A and 1B are views showing an example of the structure of a sensor unit according to the first embodiment.

Preferred embodiments of the present invention will be explained in detail below with reference to the accompanying drawings. Note that the arrangements disclosed in the following embodiments are merely examples, and the present invention is not limited to these arrangements shown in the drawings.

First Embodiment

Figure 2:
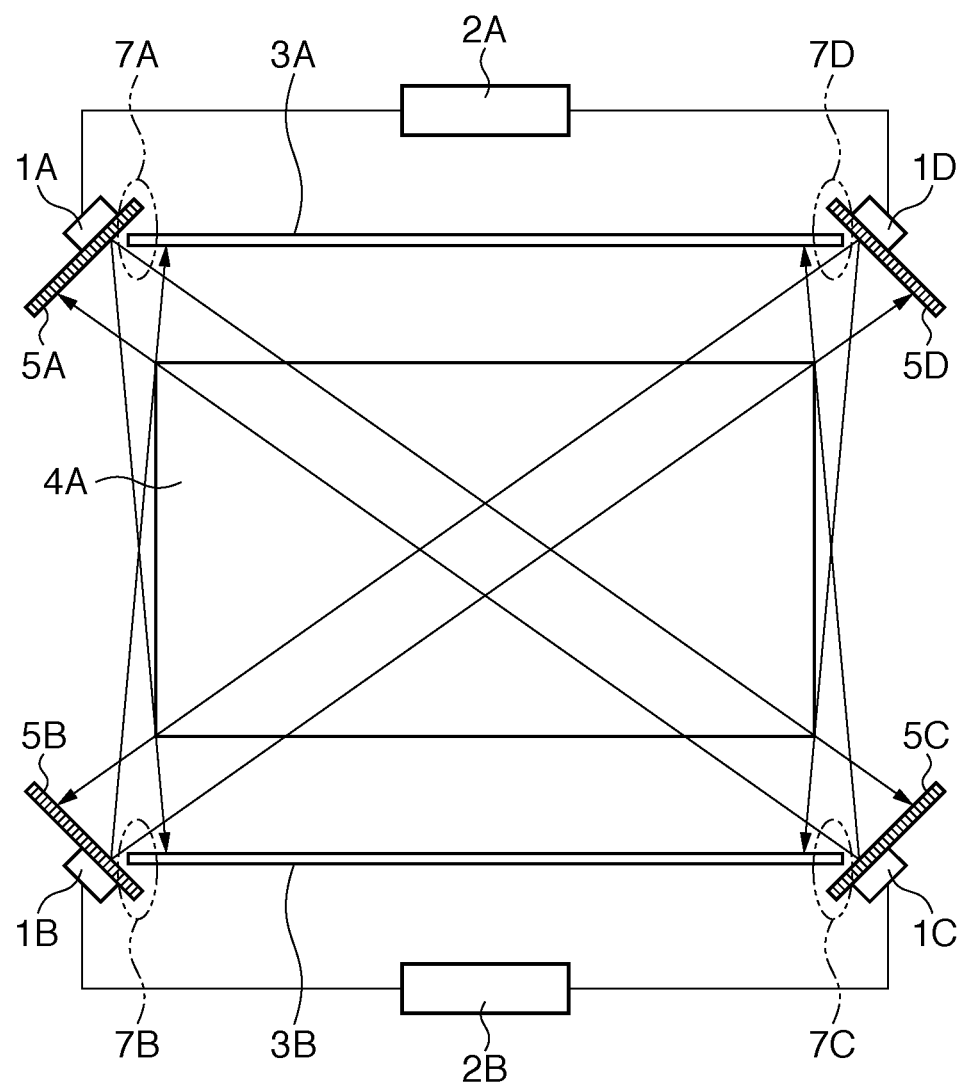
FIG. 2 is a schematic view of an example of a coordinate input apparatus according to the first embodiment.

An outline of a coordinate input apparatus according to this embodiment will be explained below with reference to FIG. 2. In FIG. 2, reference numerals 1A to 1D denote sensor units each including a light projecting unit and light receiving unit. These sensor units are spaced apart from each other by a predetermined distance, and each connected to a control unit 2A or 2B for performing control and arithmetic operations. Each sensor unit receives a control signal from the control unit, and transmits a detected signal to the control unit.

Reference numerals 3A, 3B, and 5A to 5D denote retroreflecting members. Each retroreflecting member has a retroreflecting surface for reflecting incident light in the incident direction, and retroreflects light projected from the sensor unit toward it. The retroreflecting member may be, for example, a member that scatters incident light, and the incident light is reflected in the incident direction in this case as well. The light receiving unit, which includes a condenser optical system, line CCD, and the like, of the sensor unit one-dimensionally detects the reflected light. The detected light amount distribution is supplied to the control unit. An input area 4A is an area for inputting coordinates. The sensor units 1A to 1D detect an object on this input area.

In this embodiment, the retroreflecting members are arranged on two opposite sides of a rectangular area including the input area. The retroreflecting member on one side is divided into the retroreflecting members 3A, 5A, and 5D. The retroreflecting members 5A and 5D form the two end portions of the retroreflecting member on one side, and the retroreflecting member 3A is positioned between the retroreflecting members 5A and 5D. The retroreflecting member on the opposite side is similarly divided into the retroreflecting members 3B, 5B, and 5C. In retroreflecting member dividing portions 7A to 7D, the retroreflecting members overlap each other so that no gap can be seen from the opposite sensor unit. For example, the retroreflecting members 5A and 3A overlap each other in the dividing portion 7A, so that retroreflected light returns even when the sensor unit 1B or 1C projects light toward the dividing portion 7A.

The retroreflecting members 3A and 3B (second members) are attached to a body (not shown). The retroreflecting members 5A to 5D (first members) are respectively attached to the sensor units 1A to 1D. The retroreflecting members 5A to 5D are inclined to the retroreflecting members 3A and 3B, such that each reflecting surface faces the center of the input area. The sensor units 1A and 1D emit (project) light toward the retroreflecting members 3B, 5B, and 5C arranged on one side, and receive the reflected light. Likewise, the sensor units 1B and 1C project light toward the retroreflecting members 3A, 5A, and 5D arranged on the other side, and receive the reflected light.

In this embodiment, the input area 4A is one plane. As shown in FIG. 2, the sensor units 1A to 1D are arranged outside the input area 4A. When the input area 4A is used as the display screen of a display device such as a PDP, rear projector, or LCD panel or when an image is projected onto the input area 4A by a front projector, the input area 4A can be used as an interactive input device. For example, when an object is positioned immediately above the input area 4A, for example, when a finger touches the input area 4A, light projected from the light projecting unit of any of the sensor units 1A to 1D is blocked. Consequently, no reflected light reaches the light receiving unit of the corresponding one of the sensor units 1A to 1D. The light receiving unit measures the intensity distribution of light in the incident direction of the light. By detecting an angle at which no reflected light enters, it is possible to determine the position of an object having blocked the light, that is, the input position.

The control units 2A and 2B can bidirectionally communicate with the sensor units 1A to 1D. The control units 2A and 2B specify the direction of the input position by using the measurement results obtained by the light receiving units of the sensor units 1A to 1D. The control units 2A and 2B cooperate with each other, and calculate (calculation unit) the coordinate position of the input position in the input area 4A from, for example, the specified direction of the input position and the distances between the sensor units 1A to 1D. In addition, the control units 2A and 2B output the coordinate position to a PC or the like connected to the coordinate input apparatus, via an interface such as a USB. This makes it possible to operate the PC, for example, draw a line on the screen or select an icon by touching the input area 4A with a finger or the like or moving a finger or the like immediately above the input area 4A.

FIGS. 11A to 11D depict examples of the input position to be detected by the sensor units 1A to 1D. As shown in FIG. 11A, an input within a region 91 shown in FIG. 11A can be detected by using the sensor units 1C and 1D. Also, an input within a region 92 shown in FIG. 11B can be detected by using the sensor units 1B and 1C. Similarly, an input within a region 93 shown in FIG. 11C can be detected by using the sensor units 1A and 1B, and an input within a region 94 shown in FIG. 11D can be detected by using the sensor units 1A and 1D.

Figure 3A:
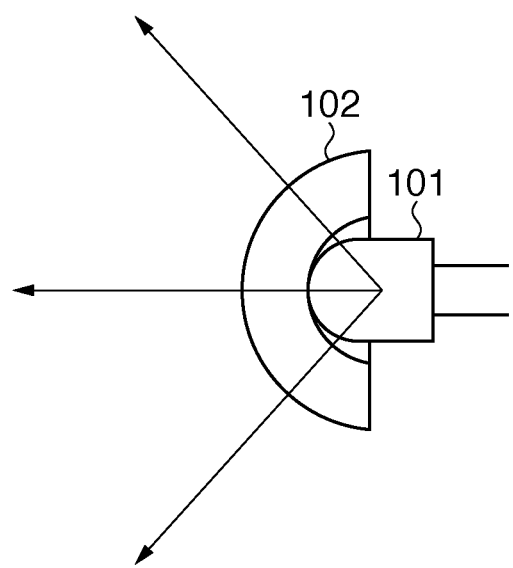
FIGS. 3A and 3B are views showing examples of the structures of a light projecting unit and light receiving unit according to the first embodiment.
Figure 3B:
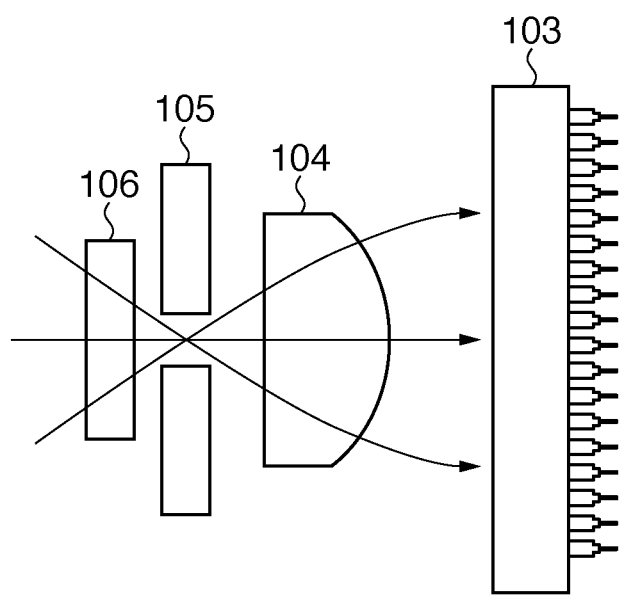

FIGS. 3A and 3B illustrate examples of the light projecting unit and light receiving unit of the sensor units 1A to 1D of this embodiment. FIG. 3A shows the light projecting unit of each of the sensor units 1A to 1D. The light projecting unit of each of the sensor units 1A to 1D includes an infrared LED 101 and light projecting lens 102. Referring to FIG. 3A, the infrared LED 101 for emitting infrared light projects the light within a predetermined range toward the retroreflecting members 3 and 5 through the light projecting lens 102. The light projecting lens 102 restricts the bundle of rays from the infrared LED 101 of the sensor unit, such that the bundle of rays becomes almost parallel to the input area, and this restricted bundle of rays is projected toward the retroreflecting members 3 and 5.

FIG. 3B shows the light receiving unit of each of the sensor units 1A to 1D. The light receiving unit of the sensor units 1A to 1D includes a one-dimensional line CCD 103, a light receiving lens 104 as a condenser optical system, a stop 105 for restricting the incident direction of incident light, and an infrared filter 106 for preventing the incidence of extra light (disturbance light) such as visible light.

The infrared light projected from the light projecting unit is retroreflected in the incident direction by the retroreflecting members 3 and 5. The light receiving units of the sensor units 1A to 1D detect the reflected light beams. More specifically, the light beams reflected by the retroreflecting members 3 and 5 propagate through the infrared filter 106 and stop 105, and condensed on the detecting element surface of the line CCD 103 by the light receiving lens 104. The line CCD 103 outputs a signal indicating a light amount distribution corresponding to the incident angle of the reflected light. The light amount distribution corresponding to the incident angle can be output from the line CCD 103 by constructing the optical system such that each pixel forming the line CCD 103 corresponds to reflected light entering at a specific angle.

Figure 1B:
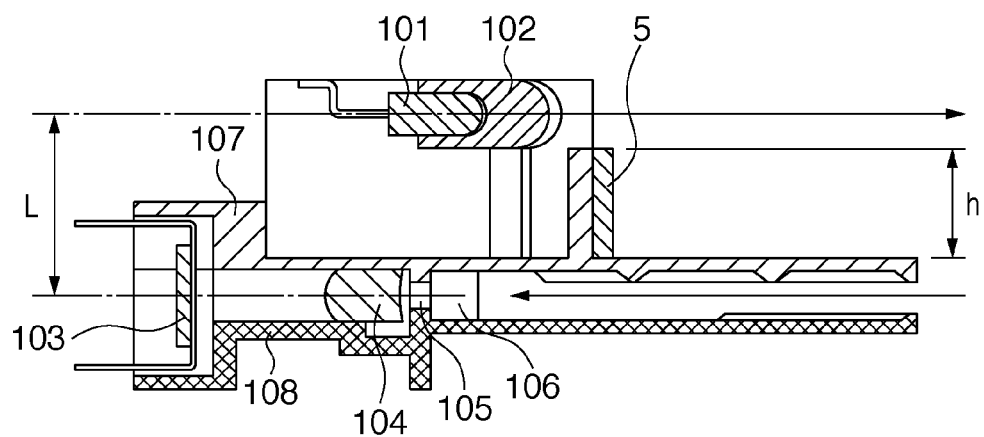

FIGS. 1A and 1B illustrate details of each of the sensor units 1A to 1D of this embodiment. FIG. 1A is a detailed perspective view of the sensor unit shown in FIG. 2. FIG. 1B is a sectional view taken along a line F-F shown in FIG. 1A. The same reference numerals as in FIGS. 3A and 3B denote the same parts in FIGS. 1A and 1B. In FIGS. 1A and 1B, reference numeral 107 denotes an upper hood member, and reference numeral 108 denotes a lower hood member. The upper hood member 107 and lower hood member 108 determine the positions of the infrared filter 106 and light receiving lens 104. Also, a bundle of rays enters a gap formed between the upper hood member 107 and lower hood member 108.

In this embodiment, the light projecting unit and light receiving unit overlap each other in a direction perpendicular to the surface of the input area 4A. The retroreflecting member 5 is arranged between the light projecting unit and light receiving unit, and attached to the upper hood member 107. That is, a set of the light projecting unit and light receiving unit are arranged to sandwich the retroreflecting member. This arrangement can prevent the retroreflecting member 5 from blocking the light projected from the light projecting unit.

For example, when the retroreflecting member 5 is arranged on the input area 4A, the projected light may be blocked due to the tolerance of a part positioned between the retroreflecting member 5 and light projecting unit. Likewise, the reflected light may be blocked due to the tolerance of a part positioned between the retroreflecting member 5 and light receiving unit. When the retroreflecting member 5 is arranged on the input area 4A, therefore, it is possible to decrease the width of the retroreflecting member 5, or form a gap between the light projecting unit and retroreflecting member 5 and between the light receiving unit and retroreflecting member 5.

When decreasing the width of the retroreflecting member 5, however, the amount of light entering the light receiving unit reduces because the reflecting surface becomes small. Also, when a gap is formed between the light projecting unit and retroreflecting member 5 and between the light receiving unit and retroreflecting member 5, the angle the projected light makes with the light to be received increases, so the amount of light entering the light receiving unit reduces.

In the arrangement of this embodiment, the retroreflecting member 5 is attached to the upper hood member 107. This makes it possible to decrease a positional error (mounting error) between the light projecting unit, light receiving unit, and retroreflecting member 5. Accordingly, it is possible to increase a width h of the retroreflecting member 5, and minimize a distance L between the light projecting unit and light receiving unit.

Figure 10A:
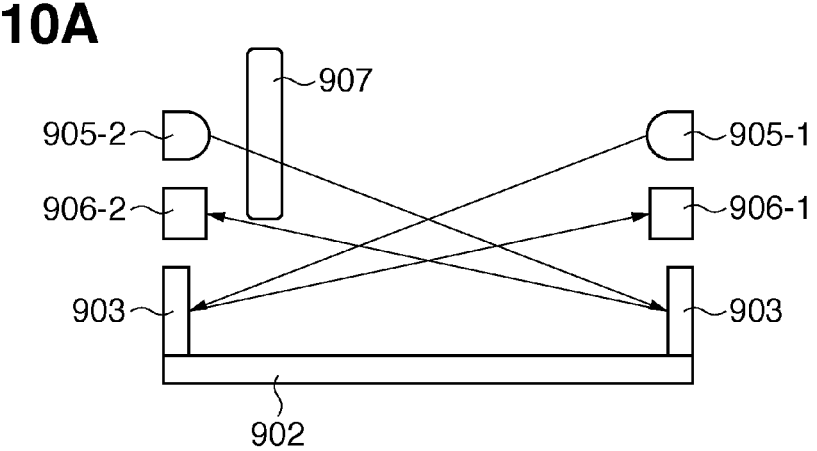
FIGS. 10A to 10C are views for explaining the structure of a sensor unit according to the first embodiment.
Figure 10B:
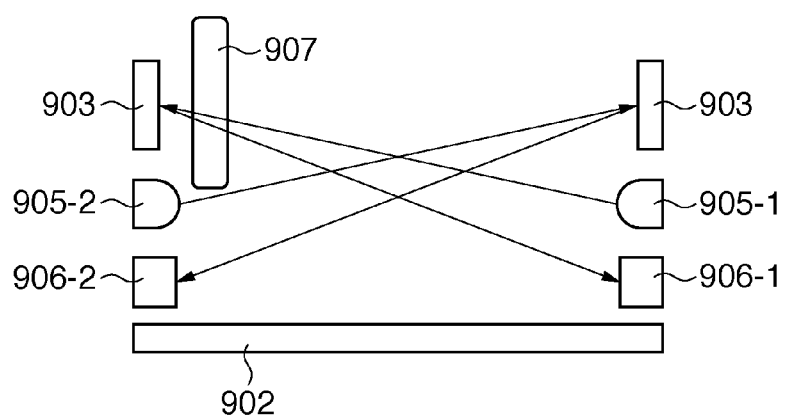
Figure 10C:
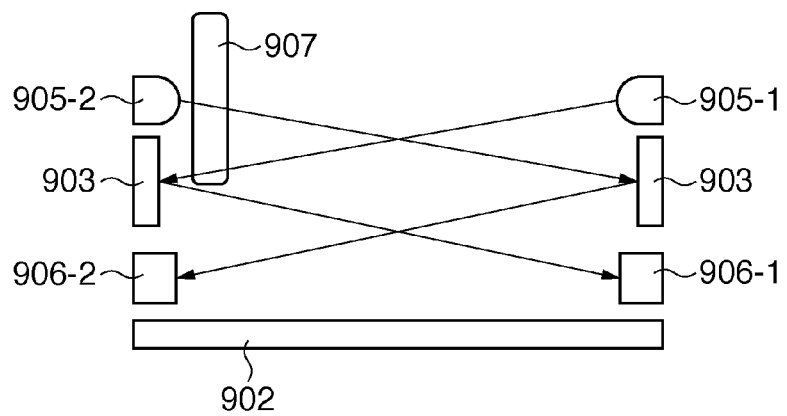

FIGS. 10A to 10C depict the relationship between the structure of the sensor units 1A to 1D and the input detectability. FIGS. 10A to 10C illustrate an input area 902, retroreflecting members 903, light projecting units 905 of the sensor units, light receiving units 906 of the sensor units, and a pointing device 907 such as a pen or finger for performing input in the input area. The distance between the pointing device 907 and input area 902 is constant throughout FIGS. 10A to 10C. Input is detected when the pointing device 907 blocks light projected from the light projecting unit 905 to the light receiving unit 906.

FIG. 10C shows an example of the structure of the sensor units 1A to 1D according to this embodiment. In this embodiment as shown in FIG. 10C, the retroreflecting member 903 is arranged between the light projecting unit 905 and light receiving unit 906. In this case, the pointing device 907 blocks light propagating from a light projecting unit 905-1 to a light receiving unit 906-1 on the right side. The pointing device 907 also blocks light propagating from a light projecting unit 905-2 to a light receiving unit 906-2 on the left side. That is, in this embodiment, both the light receiving units 906-1 and 906-2 can detect the existence of the pointing device 907, so both the light receiving units 906-1 and 906-2 can detect the input position of the pointing device 907.

On the other hand, the position detectability decreases when the light projecting unit 905 and light receiving unit 906 are arranged above the retroreflecting member 903 as shown in FIG. 10A. That is, referring to FIG. 10A, the pointing device 907 blocks light propagating from the light projecting unit 905-2 to the light receiving unit 906-2 on the left side, but does not block light propagating from the light projecting unit 905-1 to the light receiving unit 906-1 on the right side. In the arrangement shown in FIG. 10A, therefore, the sensor unit on the left side can detect the input position of the pointing device 907, but the sensor unit on the right side cannot detect the input position of the pointing device 907. More specifically, in the arrangement shown in FIG. 10A, if the pointing device 907 is close to one sensor unit, the position detectability of the other sensor unit decreases.

Furthermore, the position detectability decreases when the light projecting unit 905 and light receiving unit 906 are arranged between the input area 902 and retroreflecting member 903 as shown in FIG. 10B. That is, referring to FIG. 10B, the pointing device 907 blocks light propagating from the light projecting unit 905-1 to the light receiving unit 906-1 on the right side, but does not block light propagating from the light projecting unit 905-2 to the light receiving unit 906-2 on the left side. In the arrangement shown in FIG. 10B, therefore, the sensor unit on the right side can detect the input position of the pointing device 907, but the sensor unit on the left side cannot detect the input position of the pointing device 907. More specifically, the position detectability of one sensor unit decreases if the pointing device 907 is close to the other sensor unit in the arrangement shown in FIG. 10B as well. In the arrangements shown in FIGS. 10A and 10B as described above, the ability to detect a position decreases when the pointing device 907 is away from the input area 902.

On the other hand, in this embodiment, the position detectability near the sensor unit including the light projecting unit and light receiving unit does not decrease although the sensor unit is arranged in the position where the retroreflecting member 5 exists. In this embodiment, the light receiving unit, retroreflecting member 5, and light projecting unit are arranged in order from the side close to the input area 4A. However, the positions of the light projecting unit and light receiving unit can also be reversed. In this embodiment, the retroreflecting members 3A and 3B and retroreflecting members 5A to 5D are divisionally arranged. However, the retroreflecting member need not be divided. The sensor units need only be arranged in at least two places for each of the retroreflecting members arranged along the two opposite sides.

Second Embodiment

In the first embodiment, the sensor unit 1 includes the light projecting unit, light receiving unit, and retroreflecting member 5, and the retroreflecting member is arranged between the light projecting unit and light receiving unit. A sensor unit 1 of this embodiment further includes retroreflecting members 8 and 9. FIGS. 4A, 4B, 5A, and 5B show examples of the sensor unit of this embodiment. The same reference numerals as in the first embodiment denote the same components in FIGS. 4A, 4B, 5A, and 5B.

Figure 4A:
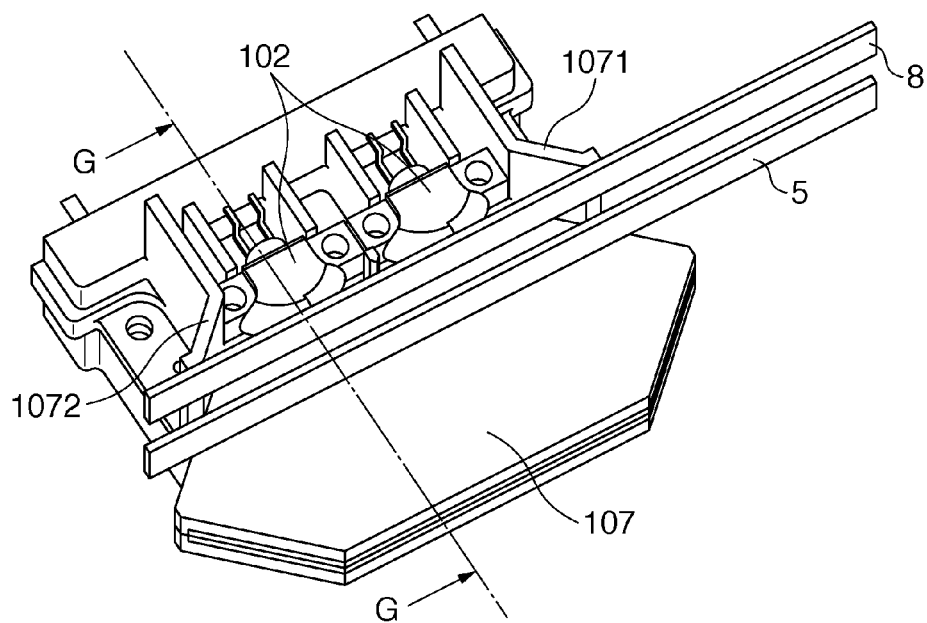
FIGS. 4A and 4B are views showing an example of the structure of a sensor unit according to the second embodiment.
Figure 4B:
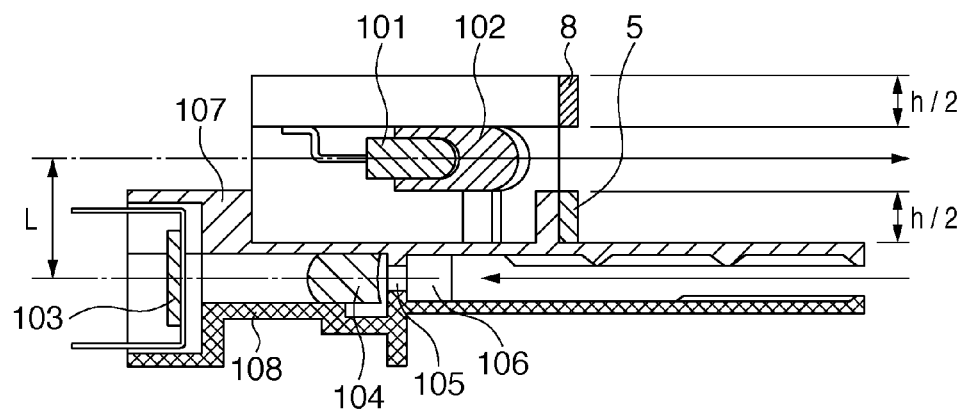
Figure 5A:
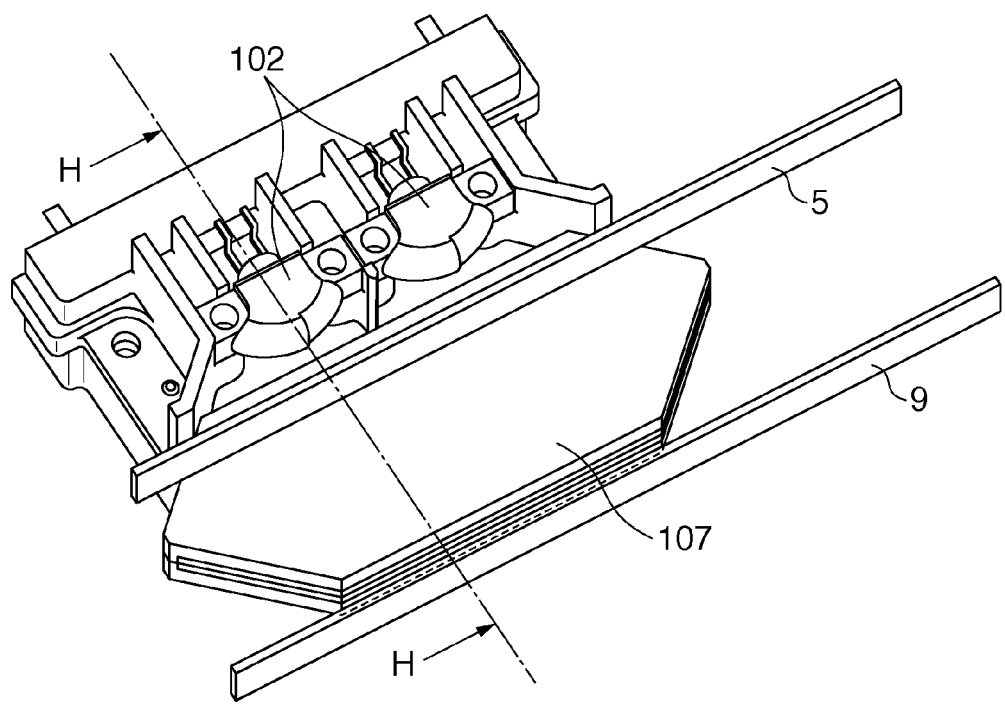
FIGS. 5A and 5B are views showing another example of the structure of the sensor unit according to the second embodiment.
Figure 5B:
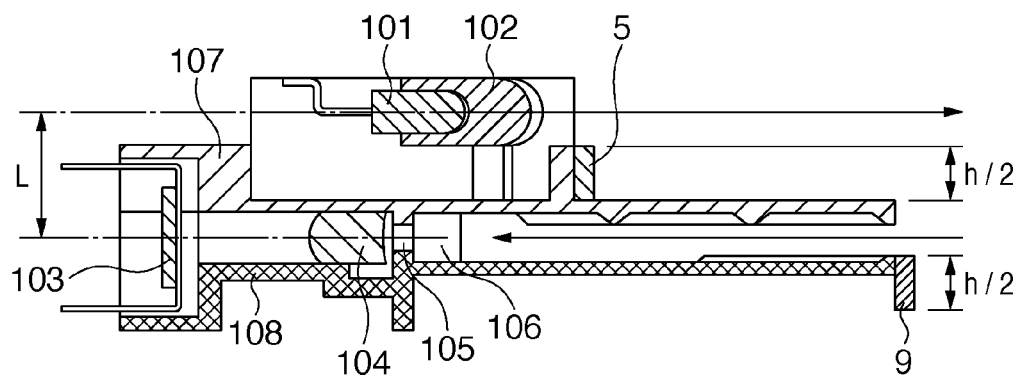

Compared to the sensor unit 1 of the first embodiment, the sensor unit 1 shown in FIGS. 4A and 4B additionally includes the retroreflecting member 8 similar to a retroreflecting member 5. Referring to FIGS. 4A and 4B, the retroreflecting members 5 and 8 sandwich the optical paths of light beams emitted from light projecting units 101 and 102. Also, compared to the sensor unit 1 of the first embodiment, the sensor unit 1 shown in FIGS. 5A and 5B additionally includes the retroreflecting member 9 similar to the retroreflecting member 5. Referring to FIGS. 5A and 5B, the retroreflecting members 5 and 9 sandwich the optical paths of light beams entering light receiving units 103 to 106.

As in this embodiment, the area of the retroreflecting surface can be increased by further including the retroreflecting member 8 or 9. In this embodiment, therefore, even when the width of the retroreflecting member 5 positioned between the light projecting unit and light receiving unit is made half that of the first embodiment, the area of the whole reflecting surface can be made almost equal to that of the first embodiment by using the retroreflecting member 8 or 9 having the same width as that of the retroreflecting surface.

In FIGS. 4A and 4B, for example, the retroreflecting member 8 has a width h/2 and is attached to rib members 1071 and 1072 of an upper hood member 107. In addition, the retroreflecting member 8 is integrated with the above-mentioned sensor unit so as to be positioned farther from an input area 4A than the light projecting unit. The retroreflecting member 5 also has the width h/2. This arrangement can have a reflecting area almost equal to that of the arrangement of the first embodiment in which the retroreflecting member 5 has the width h. On the other hand, in the arrangement shown in FIGS. 4A and 4B, a distance L between the light projecting unit and light receiving unit can be shortened because the width of the retroreflecting member 5 decreases. This allows the light receiving unit to detect light emitted from the light projecting unit and reflected by the retroreflecting member more easily than in the first embodiment.

In FIGS. 5A and 5B, the retroreflecting member 9 is attached to a lower hood member 108. In addition, the retroreflecting member 9 is integrated with the above-mentioned sensor unit so as to be positioned closer to the input area 4A than the light projecting unit. The width of the retroreflecting members 5 and 9 can be h/2 in this arrangement as well. In this case, light detection is easier than that of the first embodiment. This embodiment has been explained by assuming that the ratio of the width of the retroreflecting member 5 to that of the retroreflecting member 8 or 9 is 0.5:0.5. However, this ratio can appropriately be changed.

Third Embodiment

Figure 6:
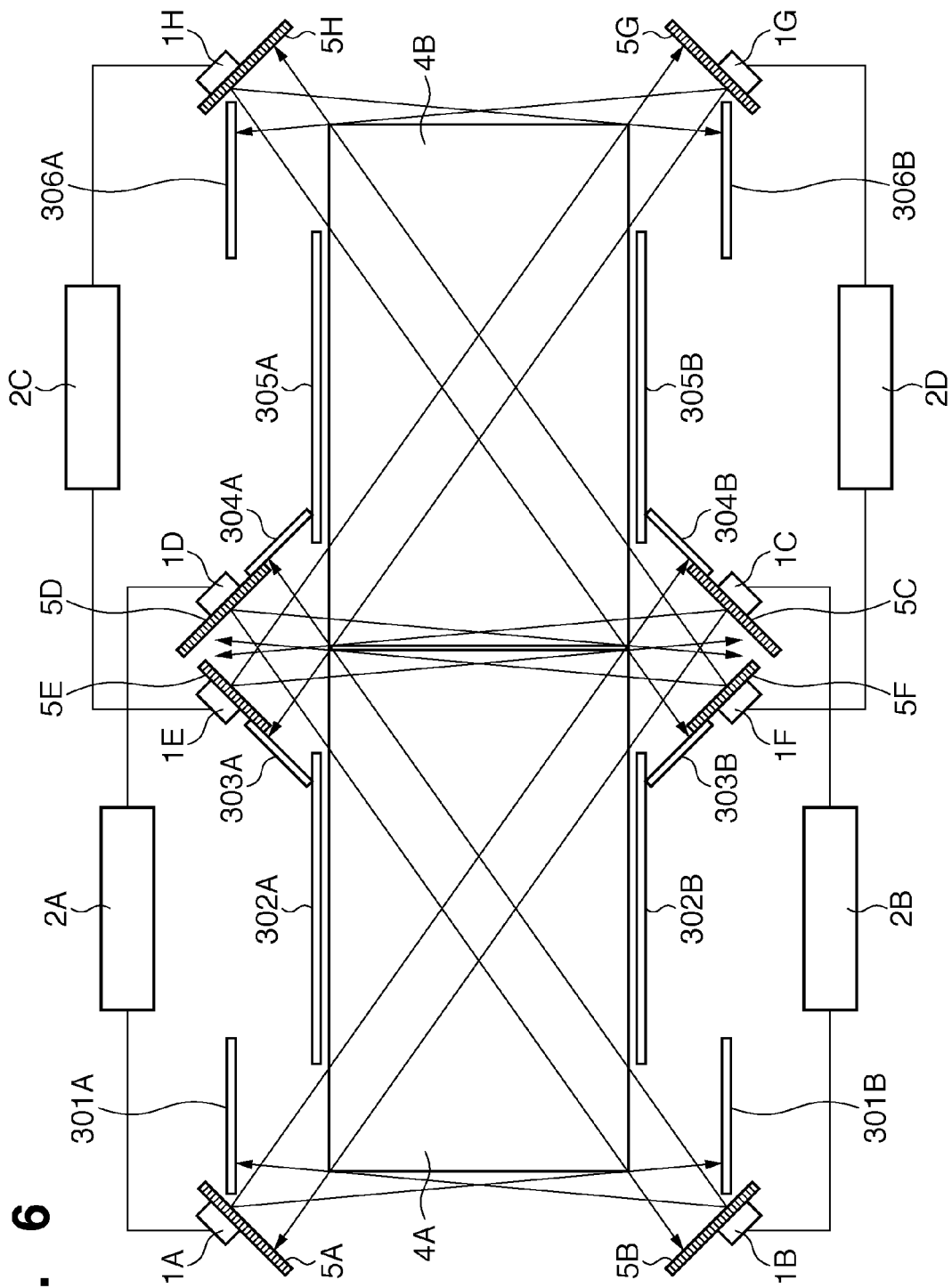
FIG. 6 is a schematic view of an example of a coordinate input apparatus according to the third embodiment.

In the first embodiment, the coordinate input apparatus using the four sensor units has been explained. In this embodiment, a coordinate input apparatus having an input area wider that that of the first embodiment by using more sensor units will be explained. FIG. 6 is a view showing an example of the arrangement according to this embodiment. The same reference numerals as in the first embodiment denote the same components in FIG. 6.

Reference numerals 1A to 1D and 1E to 1H are sensor units each having a light projecting unit and light receiving unit. The sensor units 1A to 1H are connected to control units 2A to 2D for performing the same operation as that in the first embodiment. The coordinate input apparatus of this embodiment has adjacent input areas 4A and 4B. The coordinate input apparatus of this embodiment detects input to the input area 4A by using the four sensor units 1A to 1D, and detects input to the input area 4B by using the four sensor units 1E to 1H. Referring to FIG. 6, the sensor units 1A to 1H are arranged outside the input areas 4A and 4B.

Reference numerals 301A to 306A, 301B, 302B, and 5A to 5D are retroreflecting members similar to those of the first embodiment. In the following description, the retroreflecting members 5A to 5D will be called first retroreflecting members. Also, the retroreflecting members 301A to 306A, 301B, and 302B will be called second retroreflecting members hereinafter. In this embodiment, the first retroreflecting members are attached to the sensor units 1A to 1D. The second retroreflecting members are attached to the body (not shown) of the coordinate input apparatus.

In this embodiment, the first and second retroreflecting members are arranged on two opposite sides of the input areas 4A and 4B. That is, the first retroreflecting members 5A, 5D, 5E, and 5H and second retroreflecting members 301A to 306A are positioned on one side, and the first retroreflecting members 5B, 5C, 5F, and 5G and second retroreflecting members 301B to 306B are positioned on the other side.

The first and second retroreflecting members positioned on one side may be arranged such that no gap can be seen from the sensor units positioned on the other side. For example, the first and second retroreflecting members can be arranged such that when the sensor unit positioned on one side projects light toward the other side, the reflected light from the retroreflecting member always returns to the sensor unit. In this embodiment, therefore, the retroreflecting members 5C and 5D are longer than the retroreflecting members 5E and 5F. However, the length of the retroreflecting members 5E and 5F may also be larger than that of the retroreflecting members 5C and 5D.

In this embodiment, the sensor units 1A and 1D project light beams toward the first retroreflecting members 5B, 5C, and 5F and second retroreflecting members 301B to 304B, and receive the reflected light beams. The sensor units 1B and 1C project light beams toward the first retroreflecting members 5A, 5D, and 5E and second retroreflecting members 301A to 304A, and receive the reflected light beams.

Analogously, the sensor units 1E and 1H project light beams toward the first retroreflecting members 5C, 5F, and 5G and second retroreflecting members 303B to 306B, and receive the reflected light beams. Also, the sensor units 1F and 1G project light beams toward the first retroreflecting members 5D, 5E, and 5H and second retroreflecting members 303A to 306A, and receive the reflected light beams.

A coordinate input apparatus having a wider input area can also be constructed by applying this embodiment. For example, it is only necessary to repetitively arrange the structure including the sensor units 1C to 1F, first retroreflecting members 5C to 5F, and second retroreflecting members 302A to 304A and 302B to 304B. The arrangement according to this embodiment described above can implement a large-sized coordinate input apparatus having an input area wider than that of the coordinate input apparatus including the four sensor units as in the first embodiment.

Fourth Embodiment

Figure 12:
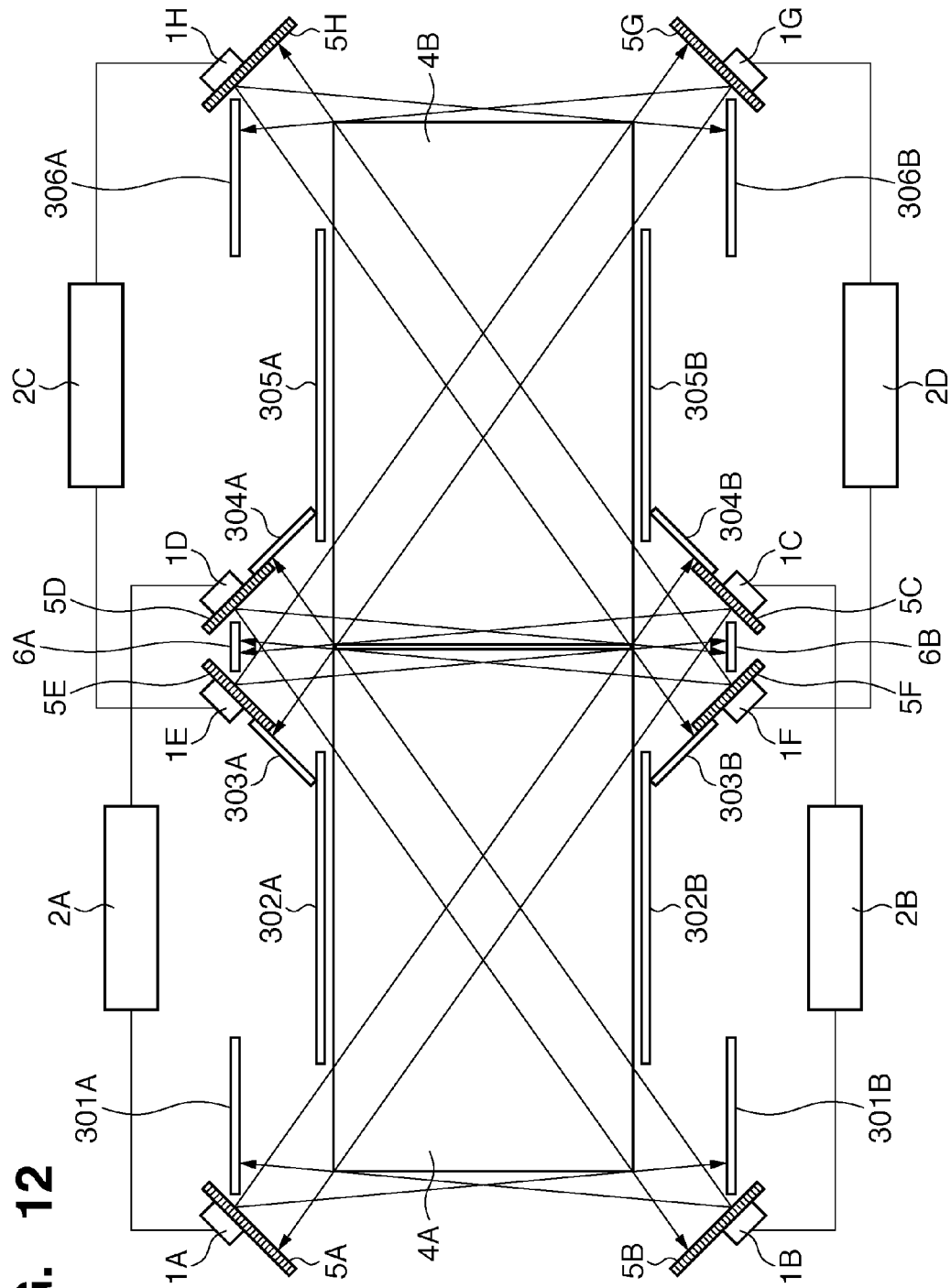
FIG. 12 is a schematic view of an example of a coordinate input apparatus according to the fourth embodiment.

In this embodiment, a second reflecting member is further added between the adjacent sensor units (between the first retroreflecting members) in the third embodiment. FIG. 12 is a view showing an example of the arrangement according to this embodiment. The same reference numerals as in the third embodiment denote the same components in FIG. 12. A coordinate input apparatus shown in FIG. 12 includes second retroreflecting members 6A and 6B attached to the body (not shown) of the coordinate input apparatus. The second retroreflecting member 6A is arranged between first retroreflecting members 5D and 5E. The second retroreflecting member 6B is arranged between first retroreflecting members 5C and 5F.

When viewed from sensor units 1B, 1C, 1F, and 1G positioned on the opposite side, the first retroreflecting members 5D and 5E and second retroreflecting member 6A overlap each other so as not to form any gap between them, in this embodiment as well. Likewise, when viewed from sensor units 1A, 1D, 1E, and 1H positioned on the opposite side, the first retroreflecting members 5C and 5F and second retroreflecting member 6B overlap each other so as not to form any gap between them. In this embodiment, the length of the first retroreflecting member attached to the sensor unit can be made shorter than that in the third embodiment by using the second retroreflecting members 6A and 6B arranged between the sensor units.

Fifth Embodiment

In the first embodiment, the sensor unit 1 is fixed to the coordinate input apparatus. In this embodiment, however, the orientation of a sensor unit 1 is adjustable. If a mounting error occurs when mounting the sensor unit 1 on the coordinate input apparatus, the amount of light entering a light receiving unit reduces. To decrease the mounting error, a part tolerance must severely be set, and this increases the cost and makes mass-production difficult. When the orientation of the sensor unit is adjustable, the adjustment can be performed to increase the amount of light entering the light receiving unit.

Figure 7A:
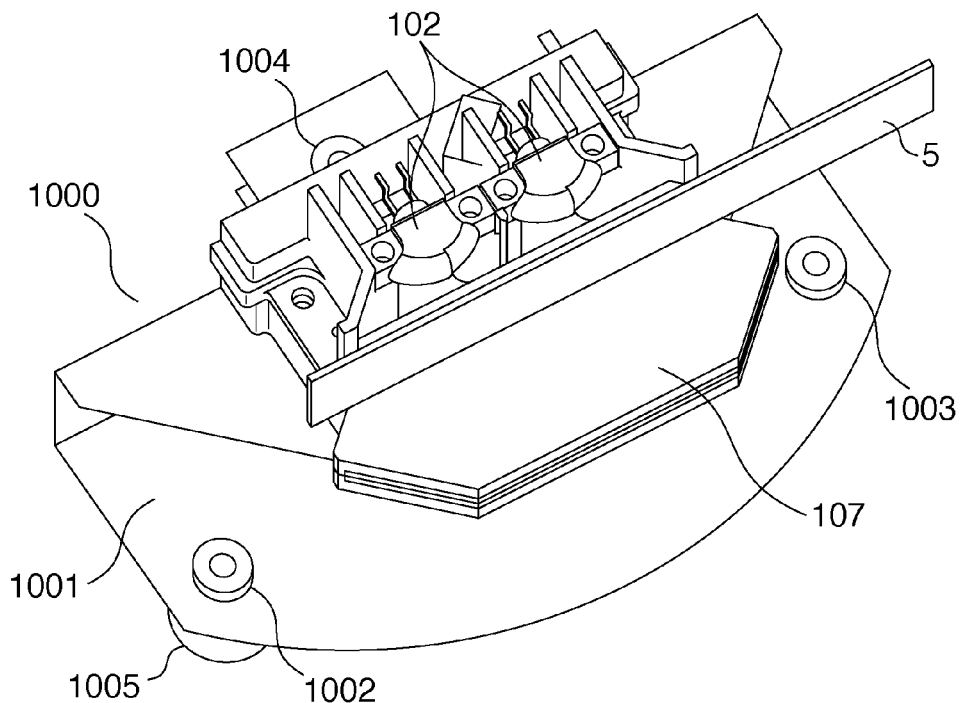
FIGS. 7A and 7B are views showing an example of the structure of a sensor unit according to the fifth embodiment.
Figure 7B:
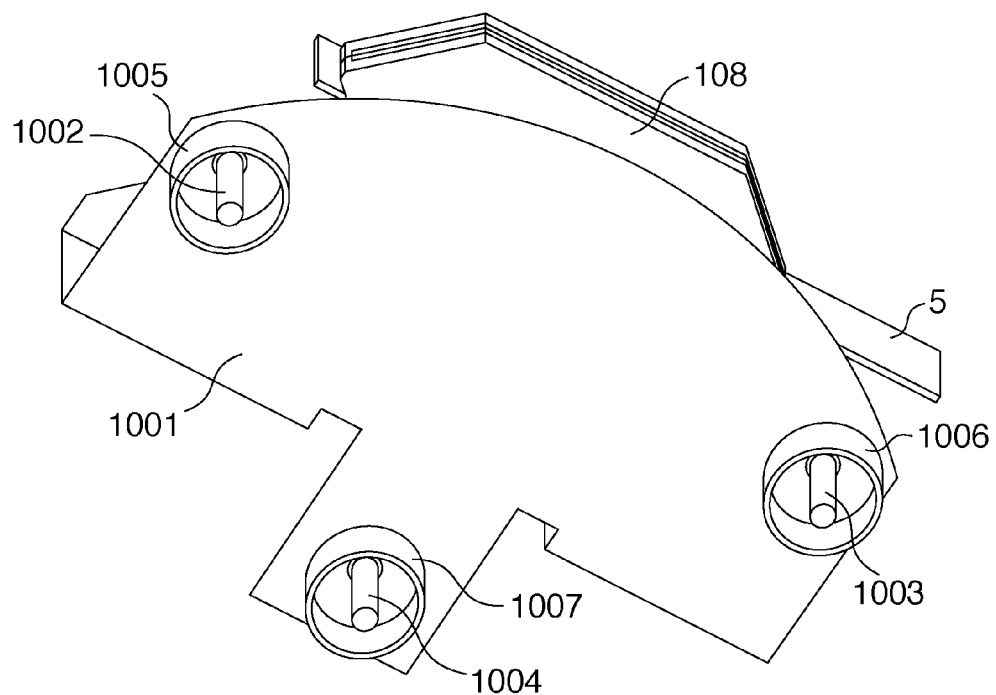

FIGS. 7A and 7B depict an example of an orientation adjusting unit 1000 according to this embodiment. The same reference numerals as in the first embodiment denote the same components. The orientation adjusting unit 1000 is attached to the body (not shown) of the coordinate input apparatus. As described in the first embodiment, a first retroreflecting member 5 is attached to an upper hood member 107.

A mounting member 1001 is a U-shaped metal plate. Orientation adjusting screws 1002, 1003, and 1004 are threadably engaged with screw holes (not shown) in the body of the coordinate input apparatus through through holes (not shown) in the mounting member 1001. Compression springs 1005, 1006, and 1007 are sandwiched between the mounting member 1001 and the body (not shown) of the coordinate input apparatus.

By adjusting the orientation adjusting screws 1002, 1003, and 1004, it is possible to adjust the distance between the mounting member 1001 and the body (not shown) of the coordinate input apparatus sandwiching the compression springs 1005, 1006, and 1007 between them. The orientation of the sensor unit 1 with respect to the body (not shown) of the coordinate input apparatus can be adjusted by thus adjusting the orientation of the mounting member 1001.

Figure 8A:
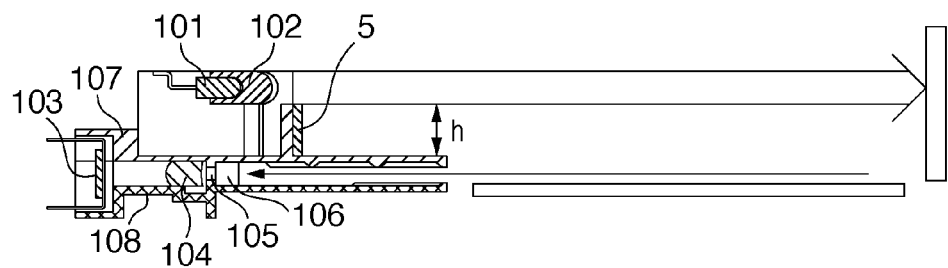
FIGS. 8A to 8F are views for explaining the orientation adjustment of the sensor unit according to the fifth embodiment.
Figure 8B:
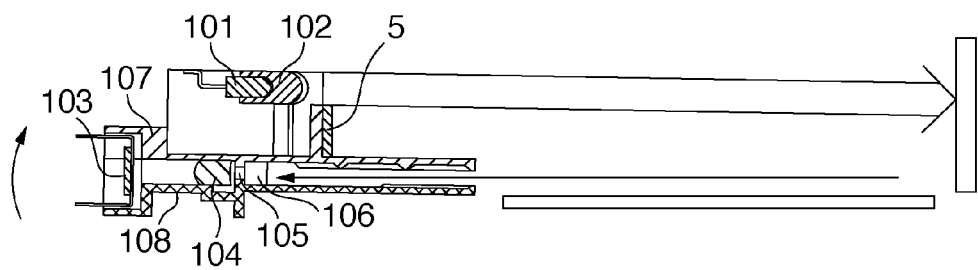
Figure 8C:
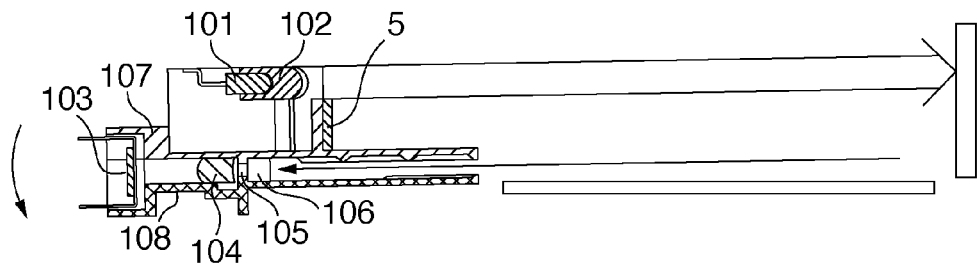
Figure 8D:
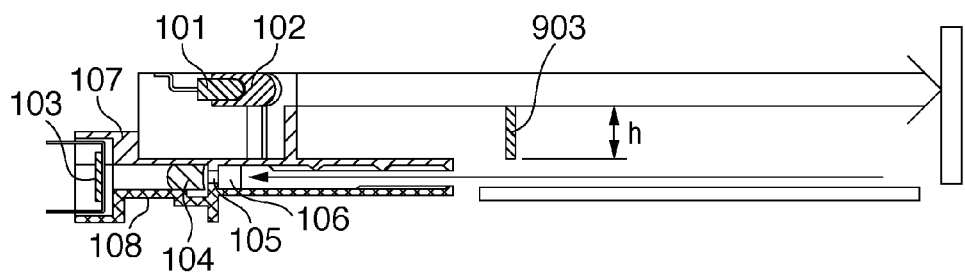
Figure 8E:
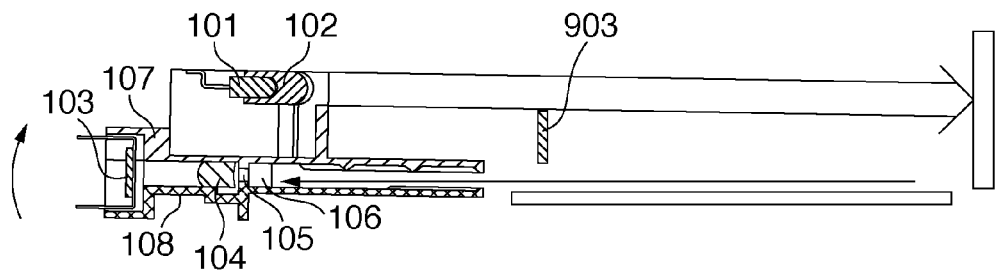
Figure 8F:
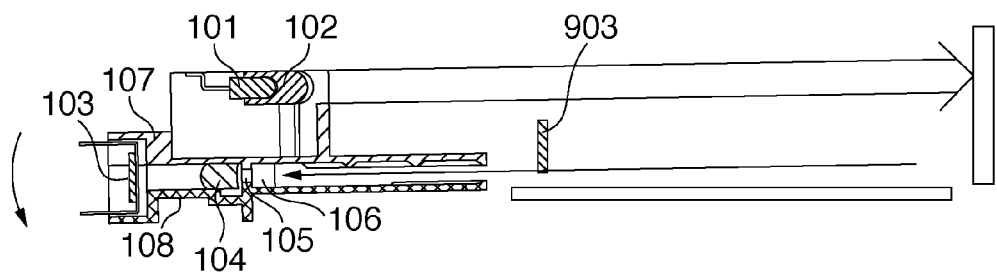
Figure 9A:
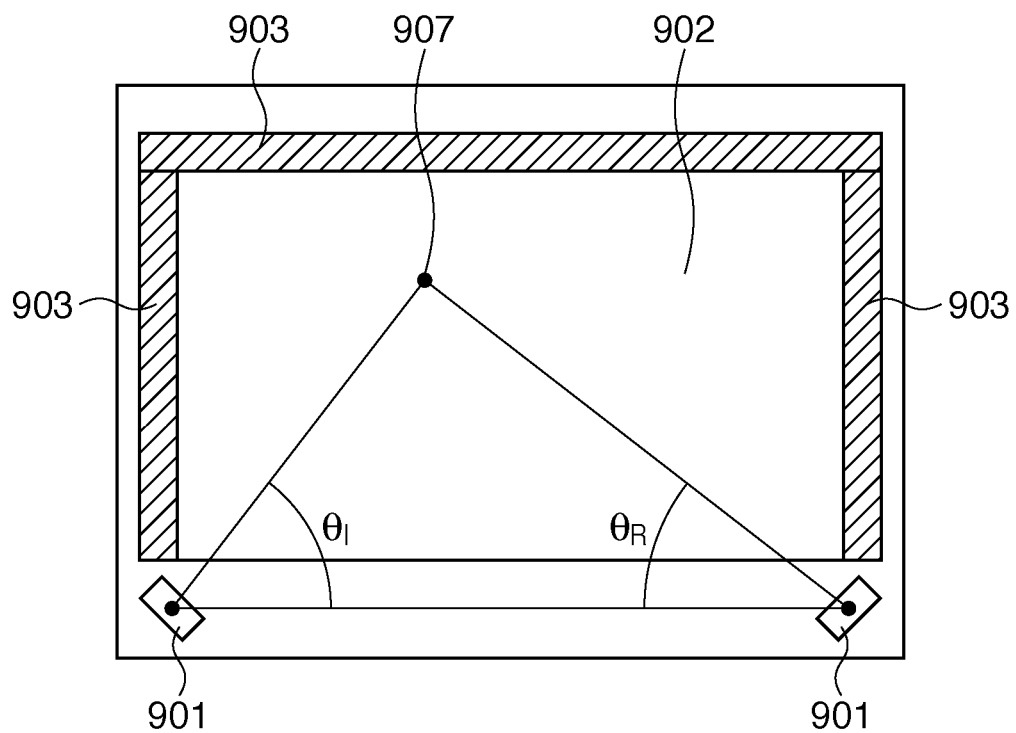
FIGS. 9A and 9B are views for explaining a coordinate input apparatus according to a prior art.
Figure 9B:
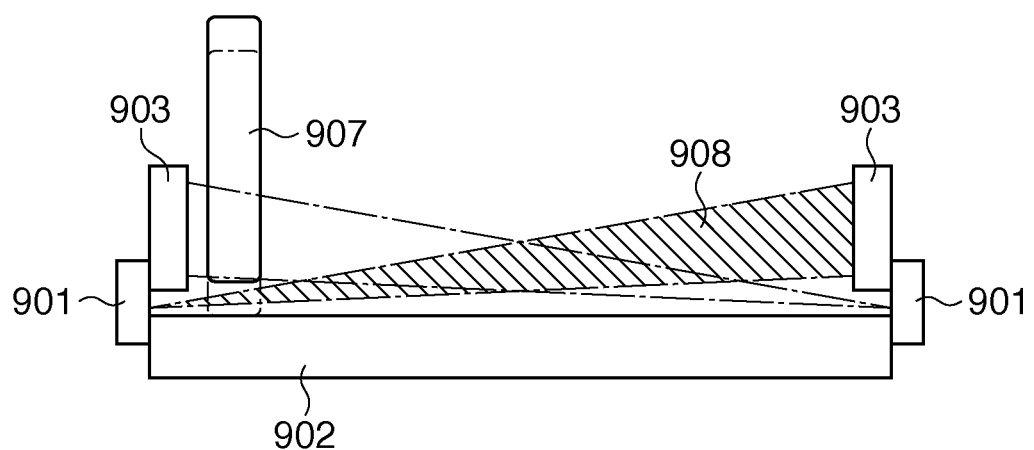

FIGS. 8A to 8C are sectional views of the sensor unit according to this embodiment. FIGS. 8D to 8F are sectional views of the sensor unit when the retroreflecting member 5 is fixed to the body (not shown) of the coordinate input apparatus. FIGS. 8A and 8D show the state in which the orientation of the sensor unit is not adjusted. On the other hand, FIGS. 8B and 8E show the state in which the orientation of the sensor unit is adjusted in the direction of an arrow. In this embodiment, the first retroreflecting member 5 is attached to the sensor unit 1, and hence moves together with the sensor unit 1. As shown in FIG. 8B, therefore, the retroreflecting member 5 does not block light from a light projecting unit even after the orientation of the sensor unit is adjusted. On the other hand, in the arrangement shown in FIG. 8E, the retroreflecting member 5 blocks the light from the light projecting unit when the orientation of the sensor unit is adjusted.

FIGS. 8C and 8E also depict the state in which the orientation of the sensor unit is adjusted in the direction of an arrow. In the arrangement of this embodiment shown in FIG. 8C, the retroreflecting member 5 does not block light entering a light receiving unit in this case as well. On the other hand, in the arrangement shown in FIG. 8F, the retroreflecting member 5 blocks the light entering the light receiving unit when the orientation of the sensor unit is adjusted. As described above, in this embodiment in which the retroreflecting member 5 is integrated with the light projecting unit and light receiving unit, the retroreflecting member 5 does not block light even when the position of the sensor unit is adjusted.

Sixth Embodiment

In the coordinate input apparatus of each embodiment described above, the spacing between the light projecting unit and light receiving unit increases when the width of the first retroreflecting member 5 is increased. Since, therefore, the angle the light from the light projecting unit makes with the light entering the light receiving unit increases, the amount of received light reduces. On the other hand, the amount of light reflected by the first retroreflecting member 5 reduces when the width of the first retroreflecting member 5 is decreased. Accordingly, the first retroreflecting member 5 has an optimum width. However, the optimum width of the retroreflecting member 5 is normally smaller than that of the second retroreflecting member 3A.

This makes the amount of light reflected by the first retroreflecting member smaller than that of light reflected by the second retroreflecting member 3A. This embodiment uses a high-reflectance retroreflecting member as the first retroreflecting member 5, in order to increase the amount of light reflected by the first retroreflecting member 5. This makes it possible to increase the amount of light reflected by the first retroreflecting member 5.

Seventh Embodiment

Figure 13:
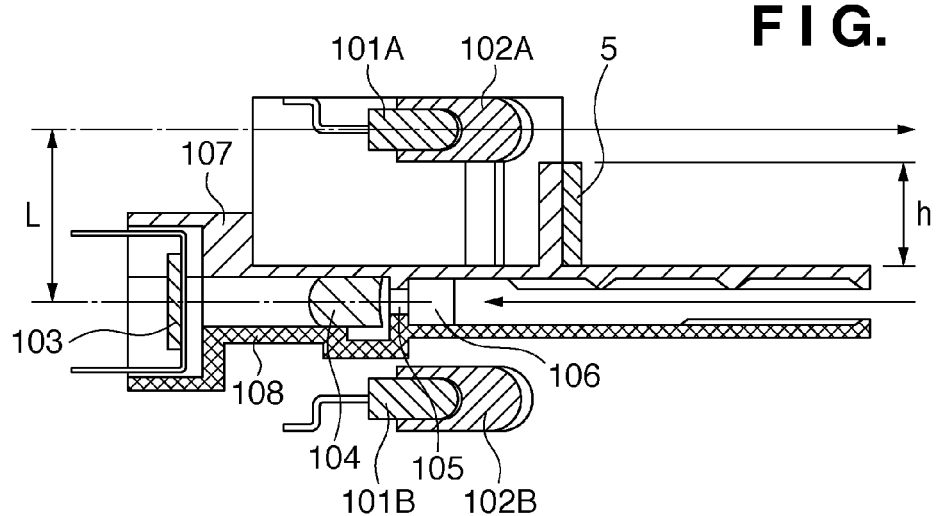
FIG. 13 is a view showing an example of the structure of a sensor unit according to the seventh embodiment.

In the sensor unit 1 of the first embodiment, the light receiving unit, retroreflecting member 5, and light projecting unit are positioned in order from the side close to the input area 4A. A sensor unit 1 of this embodiment includes another light projecting unit. FIG. 13 shows an example of the sensor unit according to this embodiment. The same reference numerals as in the first embodiment denote the same components.

The sensor unit 1 shown in FIG. 13 includes a light projecting unit including an infrared LED 101A and light projecting lens 102A, a light receiving unit, a retroreflecting member 5, and a light projecting unit including an infrared LED 101B and light projecting lens 102B, in order from the side close to an input area 4A. Since the sensor unit 1 of this embodiment includes the two light projecting units, the amount of projected light can be made twice that of the first embodiment. Consequently, the amount of received light can be made larger than that in the first embodiment.

Eighth Embodiment

Figure 14:
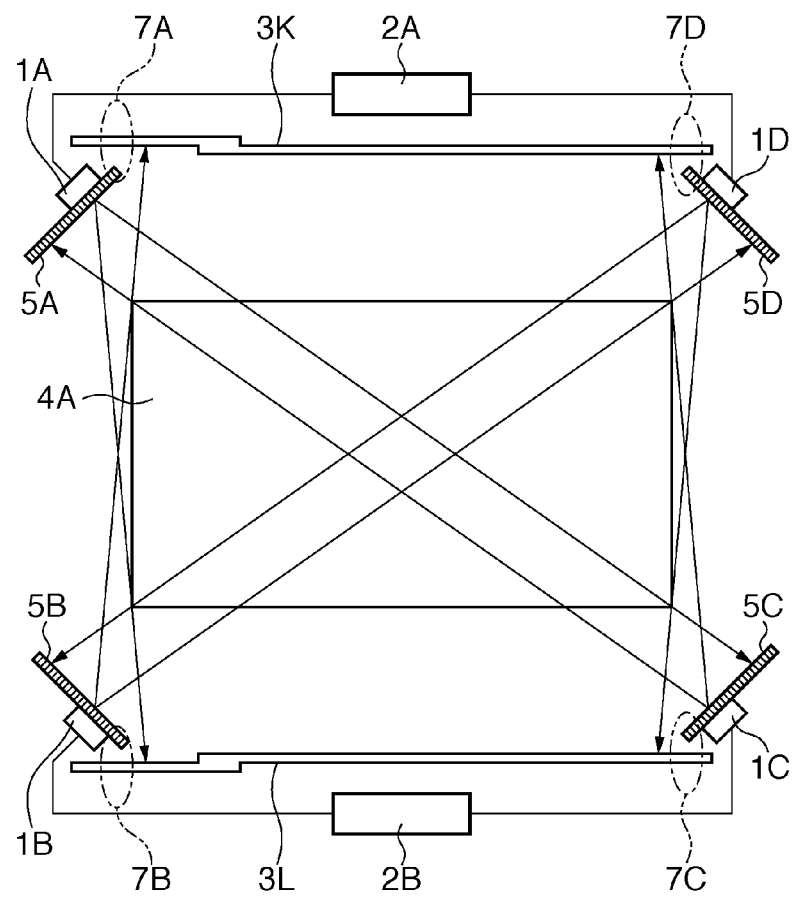
FIG. 14 is a schematic view of an example of a coordinate input apparatus according to the eighth embodiment.
Figure 15:
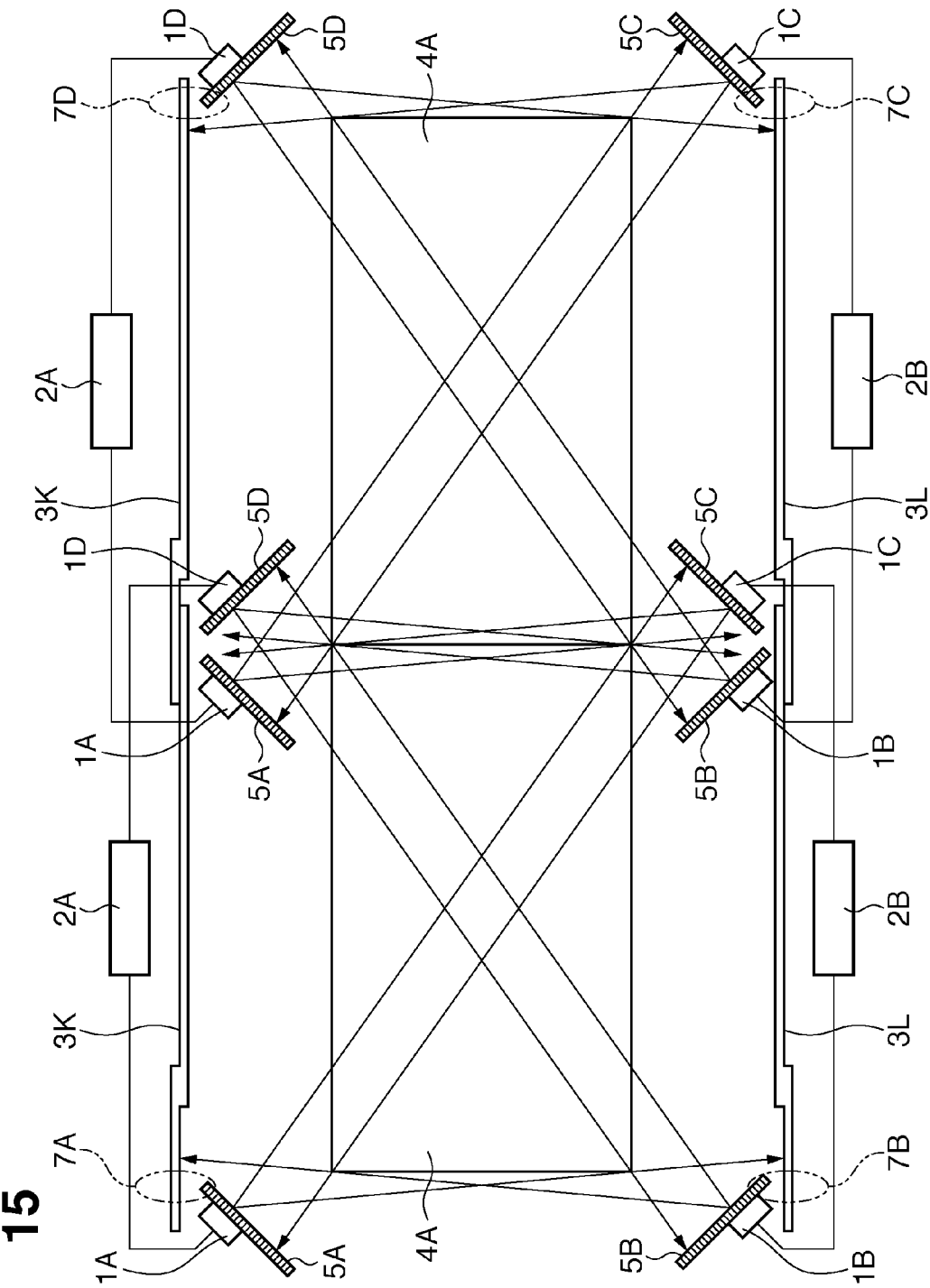
FIG. 15 is a schematic view of an example in which a plurality of coordinate input apparatuses according to the eighth embodiment are arranged.

FIG. 14 is a view showing an example of the arrangement of a coordinate input apparatus according to this embodiment. In the coordinate input apparatus according to this embodiment, the layout of retroreflecting members 3A and 3B shown in FIG. 2 is changed when compared to the first embodiment. A plurality of coordinate input apparatuses according to this embodiment can be connected. A wider input area can be formed by connecting a plurality of coordinate input apparatuses. As an example, FIG. 15 shows the way two coordinate input apparatuses according to this embodiment are connected. The same reference numerals as in the first embodiment denote the same components in FIG. 14.

In the coordinate input apparatus shown in FIG. 14, retroreflecting members 3K and 3L attached to the body (not shown) of the coordinate input apparatus are respectively arranged outside sensor units 1A and 1D and sensor units 1B and 1C. As shown in FIG. 15, when two coordinate input apparatuses of this embodiment are juxtaposed, the retroreflecting member 3K of one coordinate input apparatus reaches the back side of a retroreflecting member 5A or 5D of the other coordinate input apparatus. The back side herein mentioned means a side away from the input area. Also, when two coordinate input apparatuses of this embodiment are juxtaposed, the retroreflecting member 3L of one coordinate input apparatus reaches the back side of a retroreflecting member 5B or 5C of the other coordinate input apparatus.

In this embodiment, when viewed from the sensor units 1B and 1C positioned on the opposite side, the retroreflecting members 5A, 5D, and 3K overlap each other so as not to form any gap between them. Likewise, when viewed from the sensor units 1A and 1D positioned on the opposite side, the retroreflecting members 5B, 5C, and 3L overlap each other so as not to form any gap between them. As a consequence, a multi-coordinate input apparatus having no gap in an input area can be constructed by juxtaposing two coordinate input apparatuses of this embodiment.

The coordinate input apparatuses according to the first to seventh embodiments need only have retroreflecting members on two opposite sides of a rectangular area including an input area. Accordingly, a large input area as disclosed in the eighth embodiment can be formed by connecting the coordinate input apparatuses such that the retroreflecting members continue without any gap.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-136650, filed Jun. 15, 2010, which is hereby incorporated by reference herein in its entirety.

What is claimed is:

1. A coordinate input apparatus for calculating a position of an object positioned on an input area, comprising:
    a first retroreflecting member and a plurality of first sensor units constructed to form a first side of two opposite sides of the input area;
    a second retroreflecting member and a plurality of second sensor units constructed to form a second side of two opposite sides of the input area,
    wherein the plurality of first and second sensor units emit, receive, and retroreflect light,
    wherein each of the plurality of first and second sensor units comprises a light projecting unit constructed to emit light at a first position toward the input area, a light receiving unit constructed to receive the light at a second position, and a third retroreflecting member disposed between a first height and a second height from the input area,
    wherein the first, second and third retroreflecting members are disposed so that the light receiving unit does not detect the object positioned at a specific portion of the input area, and
    wherein the first height is a height of the first position at which the light projecting unit emits the light, and the second height is a height of the second position at which said light receiving unit receives the light; and
    a calculation unit constructed to detect a direction of a position where the light emitted from one of said first sensor units to said second retroreflecting member and said second sensor units is blocked based on a receiving result of the one of said first sensor units when the light is blocked in an area formed by said second retroreflecting member, said second sensor units and the one of said first sensor units,
    to detect a direction of the position where the light emitted from one of said second sensor units to said first retroreflecting member and said first sensor units is blocked based on a receiving result of the one of said second sensor units when the light is blocked in an area formed by said first retroreflecting member, said first sensor units and the one of said second sensor units,
    to select two sensors from said first and second sensor units based on the position where the light is blocked, and
    to calculate the position based on directions of the position where the light is blocked detected from the two sensor units selected based on the position where the light is blocked.

2. The apparatus according to claim 1, wherein
    said first retroreflecting members overlaps the third retroreflecting member of each of the plurality of said first sensor units, and said second retroreflecting member overlaps the third retroreflecting member of each of the plurality of said second sensor units, and
    a reflecting surface of the third retroreflecting member faces a center of the input area.

3. The apparatus according to claim 1, wherein
    a length of a reflecting surface of said third retroflecting member is smaller than that of reflecting surfaces of said first and second retroflecting members.

4. The apparatus according to claim 1, wherein
    a reflectance of a reflecting surface of said third retroreflecting member is higher than that of reflecting surfaces of said first and second retroreflecting members.

5. A retroreflecting assembly used with another retroreflecting assembly for forming an input area where a position of an object positioned on the input area is to be calculated, comprising:
    a first retroreflecting member; and
    a plurality of sensor units, wherein said first retroreflecting member and the plurality of sensor units are configured to form a first side of two opposite sides of the input area,
    wherein each of said plurality of sensor units comprises a light projecting unit constructed to emit light toward the area, a light receiving unit constructed to receive the light emitted from said light projecting unit and reflected by said other retroreflecting assembly, a hood for introducing the light reflected by said other retroreflecting assembly to said light receiving unit, and a second retroreflecting member disposed between a first height and a second height from the input area,
    wherein the first height is a height at which said light projecting unit emits the light, and the second height is a height of an opening of the hood introducing the light to said light receiving unit, and wherein a part where the second retroreflecting member reflects the light and a part where said light projecting unit emits the light are disposed farther from said other retroreflecting assembly than the opening of the hood, introducing the light to said light receiving unit.

6. The assembly according to claim 5, wherein said first retroreflecting member overlaps said second retroreflecting member disposed in each of said sensor units, and a reflecting surface of the second retroreflecting member disposed in each of said sensor units faces a center of the input area.

7. The assembly according to claim 5, wherein a length of a reflecting surface of said second retroreflecting member is smaller than that of a reflecting surface of said first retroreflecting member.

8. The assembly according to claim 5, wherein a reflectance of a reflecting surface of said second retroreflecting member is higher than that of reflecting surfaces of said first retroreflecting member.

9. A sensor unit used for a coordinate input apparatus for calculating a position of an object positioned on an input area, the coordinate input apparatus comprising: retroreflecting assemblies and a plurality of sensor units including the sensor unit constructed to form the input area, the sensor unit constructed to form a first side of two opposite side of the input area, and comprising a light projecting unit constructed to emit light toward the input area, a light receiving unit constructed to receive the light emitted from said light projecting unit and reflected by one of said retroreflecting assemblies for forming a second side of two opposite sides of the input area, a hood for introducing the light reflected by the one of said retroreflecting assemblies to said light receiving unit, and a retroreflecting member disposed between a first height and a second height from the input area, wherein the first height is a height at which said light projecting unit emits the light, and the second height is a height of an opening of the hood introducing the light to said light receiving unit, and wherein a part where the retroreflecting member of the sensor unit reflects the light and a part where said light projecting unit emits the light are disposed farther from the one of said retroreflecting assemblies than the opening of the hood introducing the light to said light receiving unit.

10. The unit according to claim 9, wherein a reflecting surface of the retroreflecting member faces a center of the input area.

11. The unit according to claim 9, wherein a length of a reflecting surface of said retroreflecting member of the sensor unit is smaller than that of reflecting surfaces of one of said retroreflecting assemblies forming the first side of two opposite sides of the input area in the direction perpendicular to the surface of the input area.

12. The unit according to claim 9, wherein a reflectance of a reflecting surface of said retroreflecting member of the sensor unit is higher than that of reflecting surfaces of the one of said retroreflecting assemblies forming the first side of two opposite sides of the input area.

13. The apparatus according to claim 1, wherein a part where the third retroreflecting member of the sensor unit of one of the two opposite sides of the input area reflects the light and a part where said light projecting unit of one of the two opposite sides of the input area emits the light are disposed farther from the other one of the two opposite sides of the input area than an opening of a hood introducing the light to said light receiving unit.

14. The apparatus according to claim 1, wherein the light projecting unit is arranged on a top side of the third retroreflecting member.

15. The apparatus according to claim 1, wherein the light receiving unit is arranged on a bottom side of the third retroreflecting member.

* * * * *